United States Patent [19]
Martin

[11] 3,931,871
[45] Jan. 13, 1976

[54] DISC BRAKE, HUB AND WHEEL ASSEMBLY

[76] Inventor: Thomas C. Martin, 54 Fayette St., Boston, Mass. 02171

[22] Filed: July 15, 1974

[21] Appl. No.: 488,314

Related U.S. Application Data

[63] Continuation of Ser. No. 297,347, Aug. 10, 1972, Pat. No. 3,825,179, which is a continuation of Ser. No. 61,258, Aug. 5, 1970, which is a continuation-in-part of Ser. No. 849,312, Aug. 12, 1969, abandoned.

[52] U.S. Cl. ............... 188/344; 188/18 A; 188/26; 188/71.6; 188/72.3; 188/218 XL; 301/6 E; 301/6 V
[51] Int. Cl.² ........................................ F16D 55/228
[58] Field of Search ........ 188/344, 72.1, 72.4, 72.5, 188/73.3, 72.3, 18 A, 59, 26, 218 A, 71.6; 301/6 E, 6 V

[56] References Cited
UNITED STATES PATENTS
2,381,166  8/1945  Hollerith .................. 301/6 E X
FOREIGN PATENTS OR APPLICATIONS
979,823  1/1965  United Kingdom .................. 188/26
372,167  6/1939  Italy .................................. 188/18 A

*Primary Examiner*—George E. A. Halvosa

[57] ABSTRACT

A disc brake construction adapted for use on front or rear wheels of motorcycles and the like. Annular steel discs are supported on opposite sides of the wheel hub. A pair of axially mounted face plates support hydraulically operated brake shoes having brake linings adapted to engage the disc. Spring returns cause the brake shoes to return to a disengaged position. A self-draining system and cooling manifold are integrally formed in the face plates.

19 Claims, 21 Drawing Figures

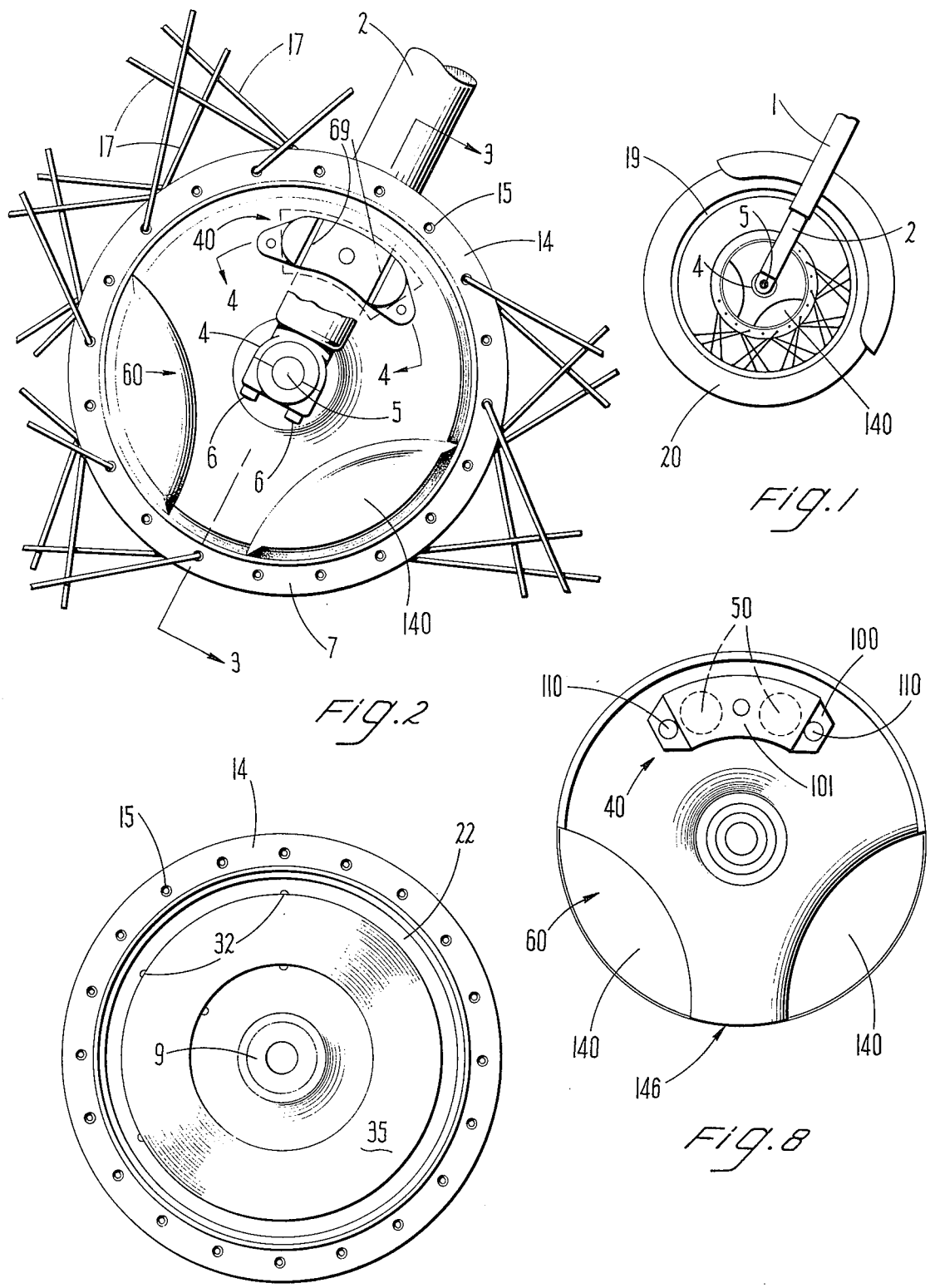

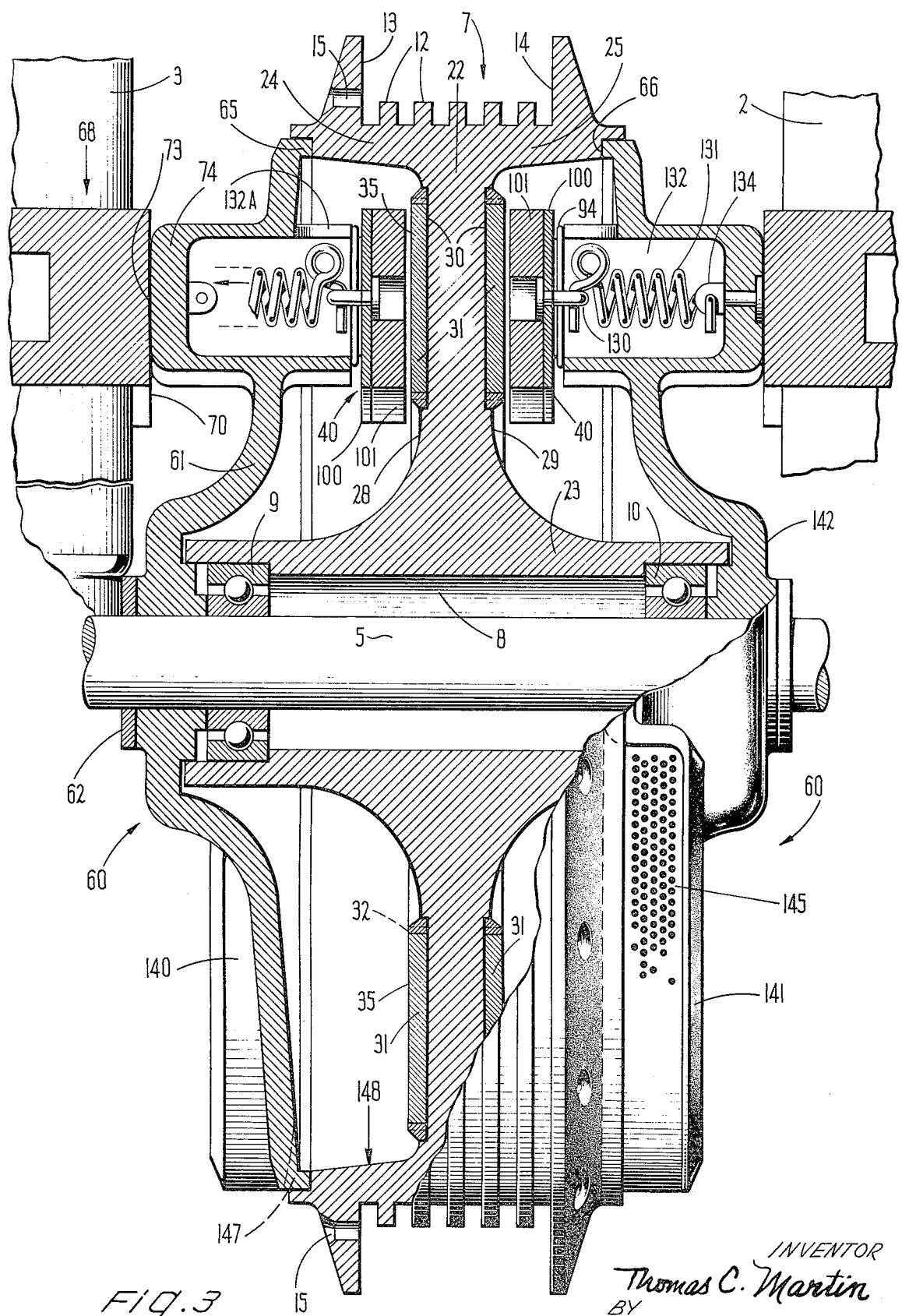

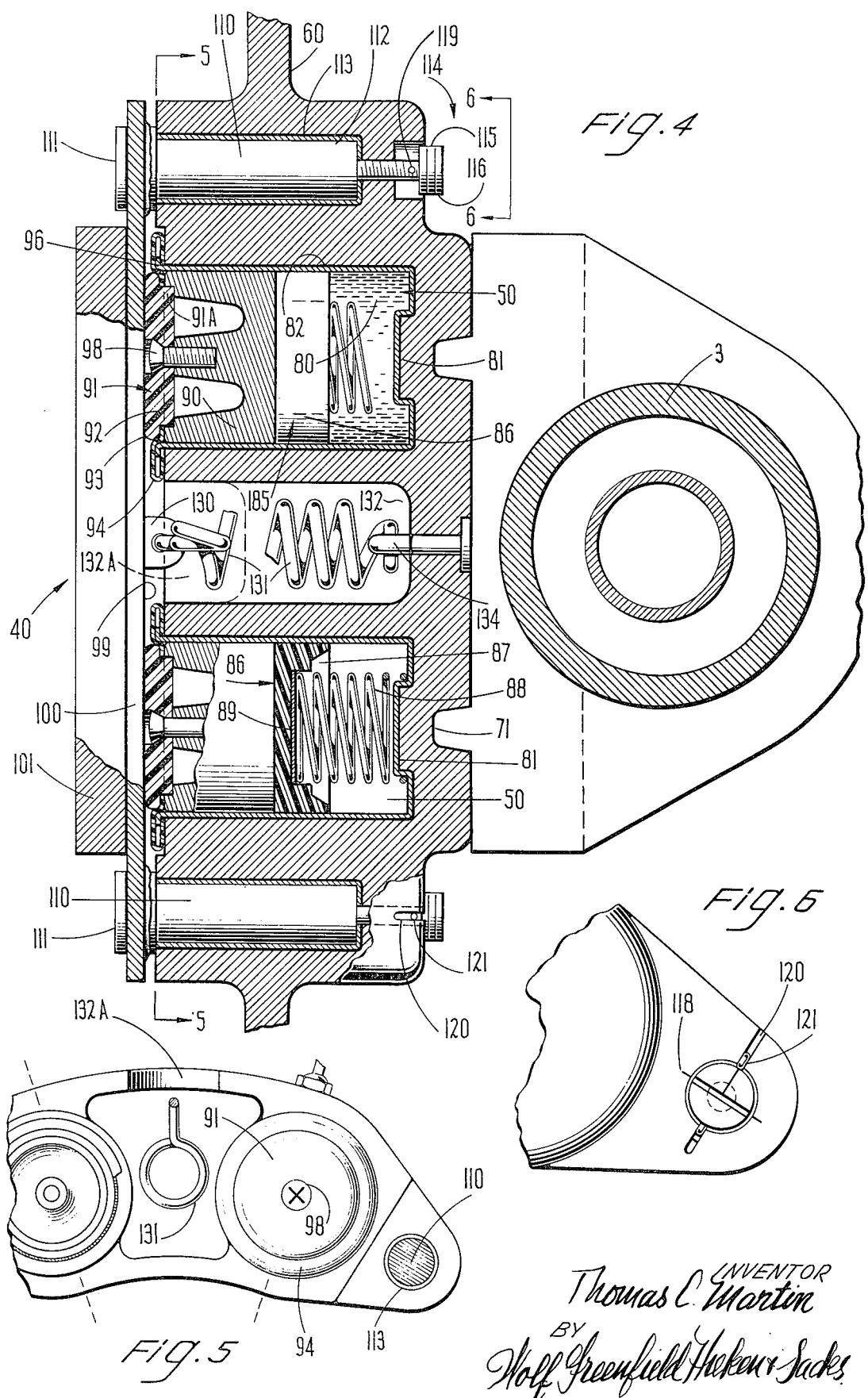

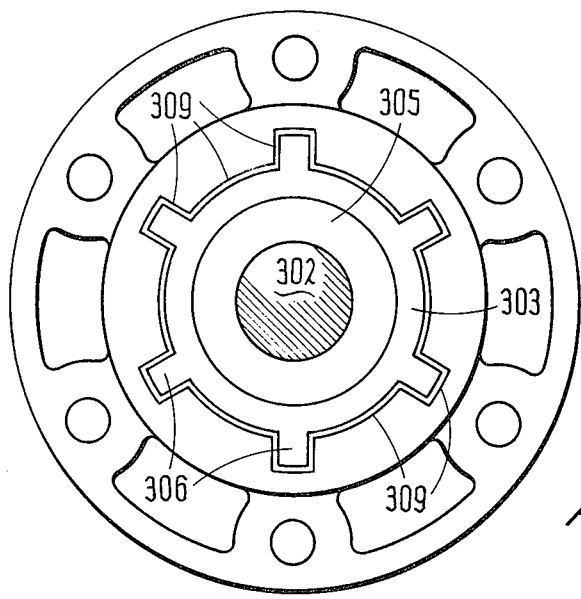
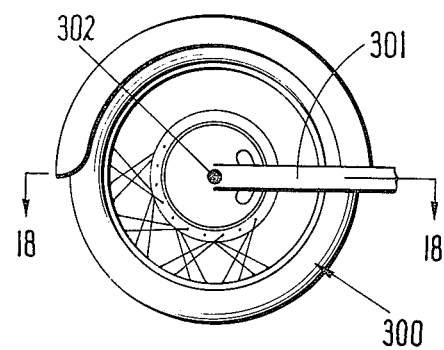
Fig. 15
Fig. 16
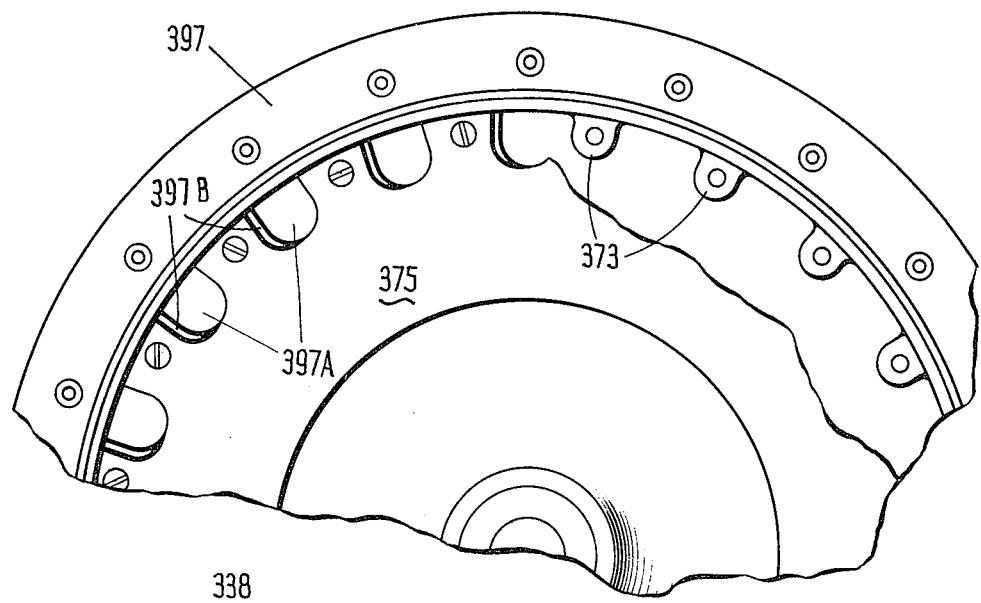
Fig. 17
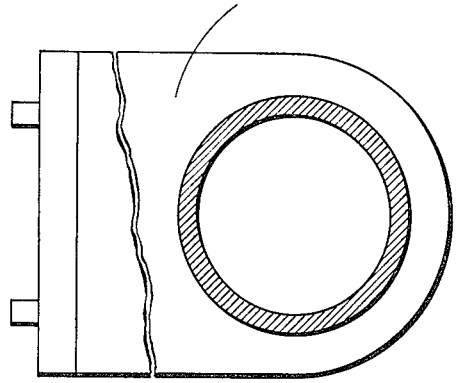
Fig. 20

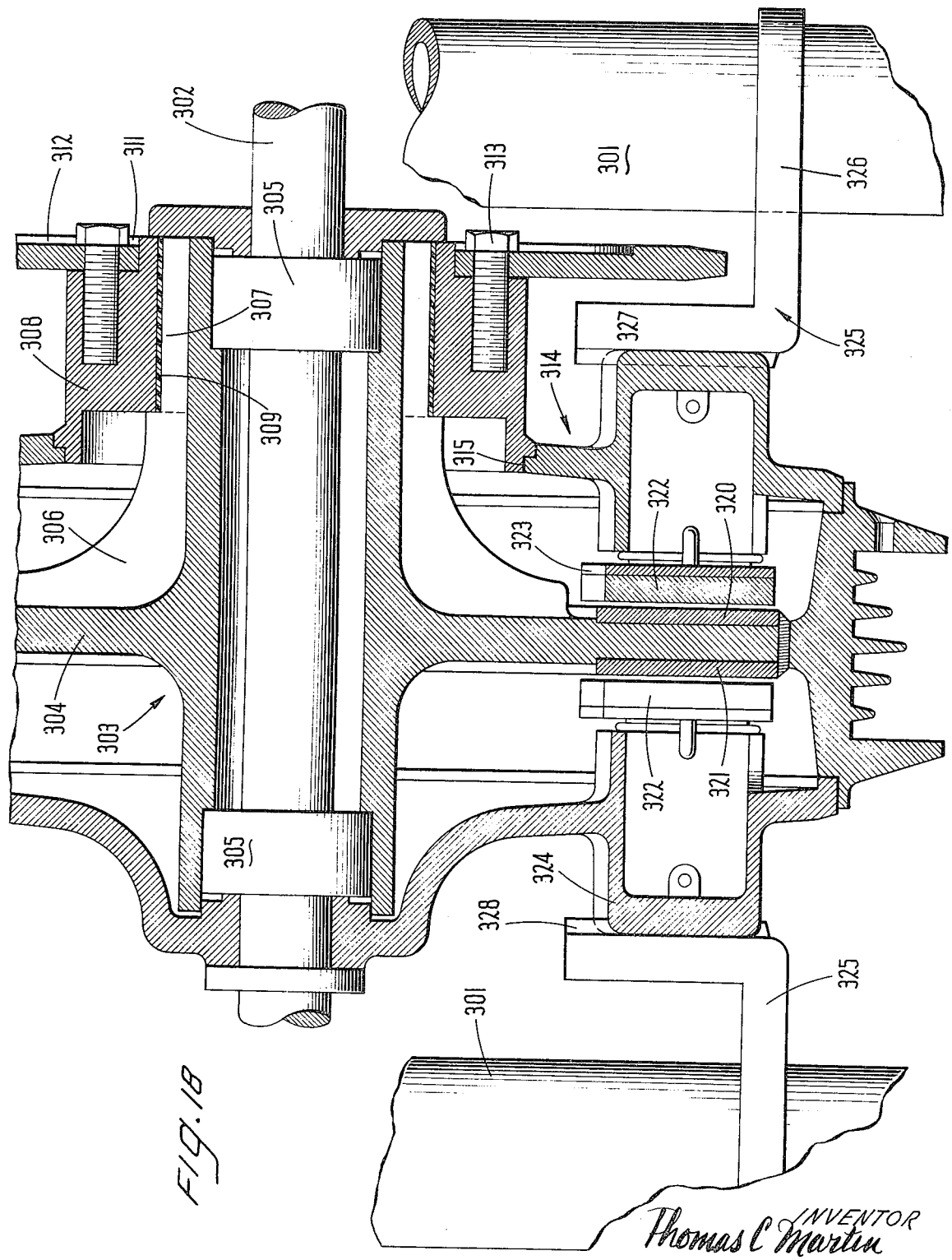

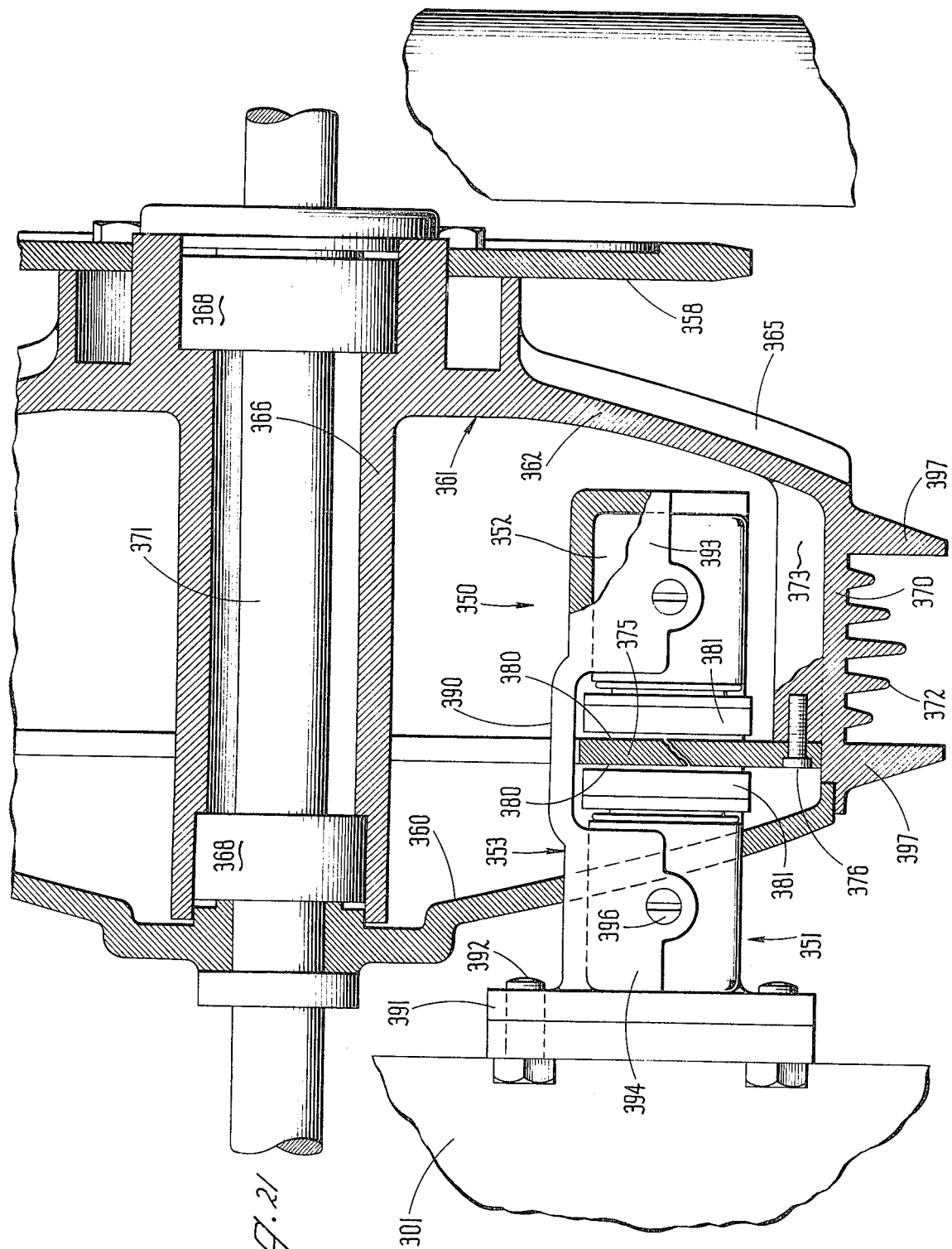

DISC BRAKE, HUB AND WHEEL ASSEMBLY

CROSS-REFERENCE TO RELATED APPLICATIONS

This application is a continuation of Ser. No. 297,347, filed Aug. 10, 1972, now U.S. Pat. No. 3,825,179 which is a continuation of Ser. No. 61,258, filed Aug. 5, 1970, which is a continuation-in-part of Ser. No. 849,312, filed Aug. 12, 1969, now abandoned.

BACKGROUND OF THE INVENTION

Disc brakes which have been designed for use in motorcycles and the like are ordinarily arranged with means for engaging bearing discs that are mounted radially with respect to the hub of the wheel on portions of the wheel to which the struts or spokes are secured. While such arrangements do not interfere with the mounting of disc brakes on the front wheel of motorcycles, substantial problems have been encountered when the prior art disc brake constructions have been adapted for the rear wheel. Generally, the rear wheels of motorcycles have drive sprockets and other attachments mounted on them. These devices occupy the space which interferes with the mounting of a conventional disc brake. For that reason, disc brakes on the rear wheel of a motorcycle have been generally confined to an arrangement in which the brake is secured to one side only of the hub. This necessary arrangement results in inefficient and occasionally dangerous operation because of the undesirable torques that are created on the application of braking forces to one side only on the wheel. In addition, where front and rear disc brakes are used, it has been conventional to use separate controls for each of the brakes in order to properly balance the braking action. Such separate controls are required because of the imbalances created with a rear disc brake that is applied to one side only of a wheel. Moreover, disc brakes heretofore used are not easy to adjust or maintain in a satisfactory operating condition. In addition, currently available disc brakes provide brake linings that have size limitations controlled by rear wheel mounting problems.

SUMMARY OF THE INVENTION

It is an object of the present invention to overcome the deficiencies of the prior art disc brakes enumerated above. In the present invention there is provided a disc brake construction which is designed for use in either or both of the front and rear wheels of motorcycles and like vehicles. In this arrangement, a disc brake is provided that has a pair of brake shoes that are adapted to engage brake discs mounted on opposite surfaces of a wheel hub with the brake shoes hydraulically and synchronously actuated. A further object of the present invention is to provide a compact disc brake system in which brake shoes are adapted to engage a bearing disc mounted close to the axis of the wheel hub and well within its outer periphery providing an adequate space between the wheel hub and fork of the cycle for supporting ancillary equipment and necessary apparatus such, for example, as the drive sprocket.

A further object of the present invention is to provide an improved disc brake in which braking action occurs in parallel planes spaced closely to and on opposite sides of a center plane passing normally through the wheel axis. One further object of the present invention is to provide an improved disc brake means in which an improved braking action can be obtained simultaneously on the front and rear wheels of a two-wheeled vehicle.

A further object of the present invention is to provide an improved disc brake arrangement adapted for use on a motorcycle wheel or the like in which the disc brake assembly is provided with self-venting holes for draining fluid which might inadvertently leak into the system.

A further object of the present invention is to provide an improved disc brake arrangement having venting holes for continuous circulation of the air through the disc brake assembly and over the brake-bearing discs. A still further object of the present invention is to provide an improved disc brake assembly that is inherently easier to maintain, repair and adjust than those heretofore available.

A further object of the present invention is to provide a disc brake assembly which is enclosed and protected, and provides an improved means for preventing grease and other undesirable materials from becoming deposited on the bearing disc or brake lining.

In the present invention there is provided a brake assembly mounted symmetrically on opposite sides of an axially supported wheel hub and providing a pair of inwardly facing face plates on opposite sides of the hub. The hub supports a pair of outwardly facing, annular, brake-bearing discs on its opposite sides of a plane passing centrally of the axle and normal to it. The face plates support at their upper ends inwardly facing, hydraulically operated brake shoes with brake linings carried by the shoes each adapted to engage the upper portion of a disc. Fluid-venting means are provided at the lower ends of the face plates intermediate the wheel hub and the face plates, and cooling vents are also provided in the lower portions of the face plates.

BRIEF DESCRIPTION OF THE DRAWINGS

The foregoing objects and advantages of the present invention will be more clearly understood when considered in conjunction with the accompanying drawings, in which:

FIG. 1 is a side elevational view of the motorcycle front wheel and hub assembly illustrating a typical position in which the invention may be employed;

FIG. 2 is a plan elevational enlarged detail, in partially fragmented form of the motorcycle hub illustrated in FIG. 1 embodying a preferred form of the present invention;

FIG. 3 is a cross sectional view taken substantially along the line 3—3 of FIG. 2;

FIG. 4 is a cross sectional view taken along the line 4—4 of FIG. 2;

FIG. 5 is a cross sectional view taken along the line 5—5 of FIG. 4;

FIG. 6 is a fragmentary view taken along the line 5—5 of FIG. 4;

FIG. 7 is an elevational view of a detail of the present invention showing the wheel hub with the face plate removed;

FIG. 8 is an elevational view of the inside of the face plate;

FIG. 15 is a side elevational view of the motorcycle rear wheel and hub assembly illustrating a typical position in which the invention may be employed;

FIG. 16 is a plan, elevational detail of the rear wheel and hub assembly with the sprocket removed;

FIG. 17 is a plan, elevational view in fragmentary detail of the interior of the hub;

FIG. 18 is a cross-section taken along the line 18—18 of FIG. 15;

FIG. 20 is a cross-sectional detail taken substantially along the line 20—20 of FIG. 19; and FIG. 21 is a modification of the embodiment illustrated in FIG. 18, and taken substantially along the line 18—18 of FIG. 15.

DESCRIPTION OF THE PREFERRED EMBODIMENTS

Figure 9:
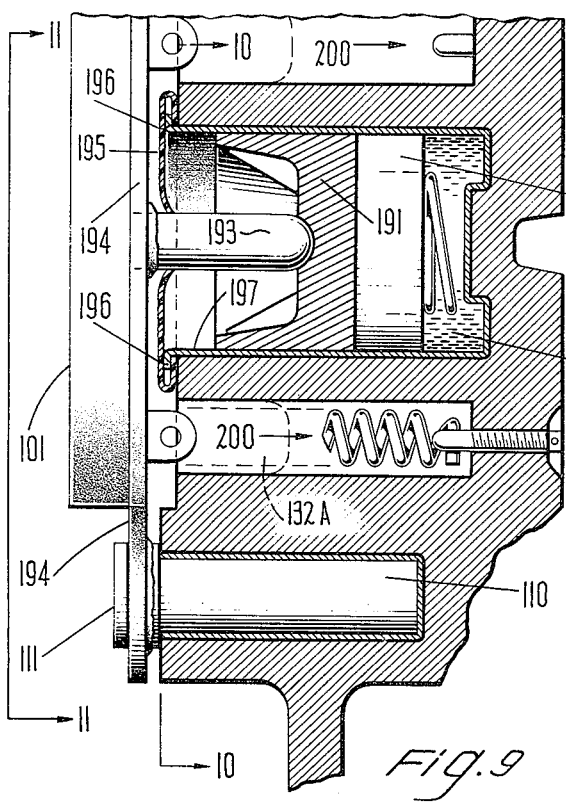
FIG. 9 is a fragmentary cross sectional view of a detail of a modification of the invention taken along a line substantially similar to the line 4—4 of FIG. 2.

The present invention is primarily designed to be used with motorbikes and the like, but may be adapted for use with other wheeled vehicles where the attachment of disc brakes are desired. In the present invention, a preferred embodiment will be illustrated in connection with the disc brake used on the front wheel of a motorcycle, as illustrated in FIGS. 1 to 14; and on a rear wheel, as illustrated in FIGS. 15 to 21.

As illustrated in FIG. 1, a motorbike ordinarily has a front fork 1 having parallel legs 2 and 3 (FIG. 3) at its lower end. These legs are integrally connected at their upper ends. Their lower ends are provided with journals 4 which support the wheel axle 5. The wheel axle 5 may be supported in any conventional fashion. The journal 4 may comprise a split ring arrangement, as illustrated in FIG. 2, with the ring's lower half secured by detachable nuts or bolts 6. Conventionally supported on fixed shaft 5 is a wheel hub 7. This wheel hub 7, best illustrated in FIGS. 2, 3 and 7, is provided with an axial hole 8 through which the shaft 5 extends. The hub 7 is supported in spaced relation to the shaft 5 for relative rotation thereto by the annular ball bearings 9 and 10. Conventional cooling ribs 12 may be provided about the periphery of the hub. Outwardly flared parallel annular flanges 13 and 14 having a series of openings 15 are provided on the hub 7 to support the spokes 17 which are connected at one end to the flanges 13, 14 and at the other to the rim 19 of the tire 20 (FIG. 1).

The wheel hub of the present invention is provided with a radially extending web 22 integral with a cylindrical center 23 at its center and outwardly flared flanges 24, 25 at its outer periphery which flanges 24, 25 support the flanges 13 and 14. The web 22 is symmetrical with respect to the cylindrical center 23 and provides opposite flat annular surfaces 28, 29. These surfaces are formed with annular recesses 30. Force fit in each of these recesses 30 is a steel bearing disc 31. These steel bearing discs 31 are each secured against rotation by a series of pins 32 (FIG. 7) which extend partially into the web 22 and partially across the plates 31. The outer surfaces 35 of these steel bearing discs 31 provide opposite annular surfaces against which the brake lining of a brake shoe may bear.

Brake shoes 40 are actuated by hydraulic cylinder means 50 supported on each of the face plates 60 (FIGS. 3 and 4). The pair of face plates 60 are each similar in configuration and are symmetrically arranged facing one another. These face plates 60 are secured and fixed to the shaft 5 on opposite sides of the hub 7. Each plate 60 has a radially extending web 61 secured between the bearings 9 or 10 and a washer 62 (FIG. 9). Preferably, the face plates 60 have an outer configuration contoured to conform substantially with the mechanisms contained between the opposed face plates 60. The face plates terminate at peripheral lips 65 that are inwardly flared and terminate in close spaced relation with shoulders 66 formed on the flanges 24, 25 of the hub 7; thus, providing a closure between the flanges 24, 25 and the shaft 5 while still providing means which permit rotation of the hub 5 relative to the face plates 60.

The face plates 60 are preferably locked to the legs 2 and 3 of the fork by lock means generally illustrated at 68. These lock means may comprise any suitable brackets secured one to each of the legs 2 and 3 and providing an interengaging lock with the outer surface of the face plates. If desired, vertical grooves 69 in the face plates 60 (FIG. 2) may be provided to interengage with corresponding ridges 70 in a brackets 70 secured one to each of the legs 2, 3 thereby preventing rotation of the face plates relative to the fork. The brackets 70 as will be noted from FIG. 3, provide a large interface area 73 between enlarged or projecting portions 74 of each face plate and the aligned bracket 70 thereby providing means for taking up or receiving outwardly moving forces generated by the application of power to the hydraulic system for braking action.

Integrally formed within each of the face plates is a hydraulic cylinder means 50 best illustrated in FIG. 4. These means include a cylindrical opening 80 having a projected axial boss 81 at the closed end of the cylinder. The cylinder is lined with a steel sleeve 82. This steel sleeve 82 should be used when the facing plates 60 are formed of aluminum to strengthen the structure. Contained within the sleeve 82 is a piston assembly generally illustrated at 85. This piston assembly 85 includes a seal element 86 preferably formed of a resilient material, such as plastic. One side of this seal member 86 is provided with a recess 87 adapted to receive one end of the helical spring 88 which bears against a metal plate 89. The other end of spring 88 is located on the boss or projection 81. A metal piston 90 is positioned in facing relation to the surface of the seal element 86 and supports a flexible resilient diaphragm means 91 at its other end. This diaphragm means may comprise a head 92 having a peripheral flange 93 which secures an annular, flexible resilient web 94 at its inner edge with the outer edge of the web 94 locked between and outwardly flared lip 96 of the sleeve 82 and the inner surface of the facing plate 60. The head 92 may be screwed to the piston 90 by a screw 98. The insert or cap 91 has a shoulder 91A that sets into a corresponding recess in the outer surface of the metal piston 90. Conventional means not shown are provided for introduction and emission of hydraulic fluid into the chamber 80 between the boss or projection 81 and the scraper means 86. This means may comprise a conventional inlet and outlet port connected by suitably tubing to a hydraulic pump which may commonly actuate the two hydraulic cylinders shown in FIG. 4 simultaneously. The system may and preferably, should provide means for simultaneously actuating the hydraulic cylinders in each of the facing plates. Where a disc system, as described, is used in forward and rear wheels of a vehicle the hydraulic cylinders, preferably, should be provided with means for common actuation of all cylinders at the same time.

The head 92' is designed to engage the outer surface 99 of the brake shoe 100. The brake shoe 100 is preferably arcuate in configuration as illustrated in FIG. 8 with the hydraulic cylinders means 50 symmetrically located as illustrated. Bonded to this arcuate brake shoe 100 is a brake lining 101 of conventional brake lining material. The brake shoe 100 and its attached lining 101 is secured and supported for movement on the inner surface of the facing plate 60 by guide pins 110. These guide pins 110 are symmetrically supported on the brake shoe at either end as illustrated in FIG. 8. Each pin 110 is provided with a head 111 (FIG. 4) that is secured by suitable means to the brake shoe. The body of the pin fits within a cavity 112 in the face plate 60. This cavity 112 may be lined with a steel sleeve 113. The end of the guide pin 110 screw the head 111 abuts an opening in the cavity 112. An adjusting screw 114 is threaded through this opening from the outer surface of the facing plate 60 and is adapted to be tightened or loosened for purposes of adjusting the position of the brake shoe as the lining wears. Since precise adjustment is important in these arrangements, the screw 114 is provided with micrometerlike reading means. In this arrangement the head 115 of the screw is formed with vertical calibrations 116. These vertical calibrations are adapted to be rotated selectively into alignment with markings 118 on the outer surface of the facing plate 60 (FIG. 6). In order to properly adjust and secure the screws 114 in a selective position, holes 119 are tapped at right angles to each other through the body of the screw 114 just underneath the head 115. These holes 119 thus may be rotated 90° into successive alignment with slot 120 which is formed in a shoulder of the facing plate 60. Thus a cotter pin 121 may be inserted through the slot 120 to lock the adjusting screw 114 into the selected adjusted position. The brake shoe is provided with an eye 130 on its surface 99 with the eye 130 designed to engage a hooked end of spring 131 that is positioned in cavity 132 within the facing plate 60. The other end of spring 131 engages hook 134 which is inserted through a hole in the facing plate 60 into the cavity 132. This spring 131 provides a return means for returning fluid to the hydraulic fluid source when a suitable valve is opened to allow passage of the fluid from the cavities 80. In addition, spring 131 returns the brake shoe to its original position when the brake is in an off position. A hole 132A in the wall of cavity 132 permits access to spring 131 for removal.

The face plates 60 are each provided with a pair of cooling manifolds 140. These cooling manifolds are integrally formed with the face plates as enlarged arcuate segments at the lower half of the plate. Each manifold is provided with an outer wall 141 (FIG. 3) substantially normal to the shaft 5 and preferably lying in a plane intermediate parallel planes passing through the hub portion 142 and the flange portions 14, 13 of the facing plate. The outer periphery of these cooling manifolds are continuous with the outer periphery of the facing plate 60 and cooperate to form a circular periphery. These outer peripheries are formed with walls radial to the shaft 5 and comprising arcuate perforated plates 145 through which air is adapted to pass. Air may thus circulate from the outside through holes in the plates 145 into the disc brake assembly between the two plates 60. The cooling manifolds 140 are preferably positioned below and symmetrical with respect to the disc brake shoe 40 (FIG. 8). The periphery of the facing plate 60 between these manifolds at the lower end of the assembly is formed devoid of the flange 65 (FIGS. 3 & 8). In this area 146 (FIG. 8) there is thus provided a slight space best illustrated in FIG. 3 which space 147 is designed to permit water or other dirt or foreign materials to pass under the influence of gravity from between the face plates 60. The inner surface of the flanges 24 and 25 are flared outwardly so as to guide such foreign materials towards the space 147 as the hub 7 is rotated.

In FIG. 9 there is illustrated an embodiment, which is otherwise than as described similar to that shown in FIG. 4. In this arrangement, the piston 191 is formed of metal and is positioned against the rubber seal 186. A rod 193 has one end engaged by piston 191 and has the brake shoe 194 secured at its other end. A diaphragm 195 has an opening through which the rod 193 extends and to which the diaphragm 195 is axially secured. The periphery of diaphragm 195 is locked under or crimped between the flange 196 of the steel sleeve 197 that lines the cavity 198. This arrangement is a one cylinder arrangement. In this arrangement the return springs generally illustrated at 200 are similar to the return springs 131.

Figure 10:
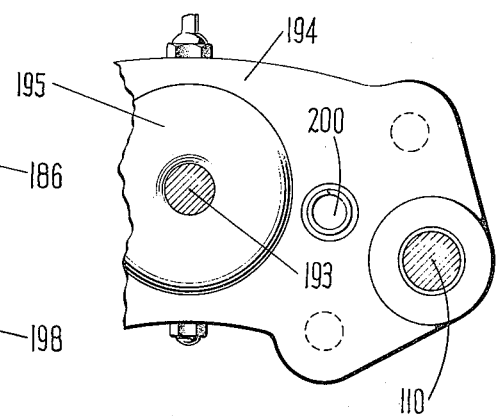
FIG. 10 is a cross-sectional view taken along the line 10—10 of FIG. 9.
Figure 11:
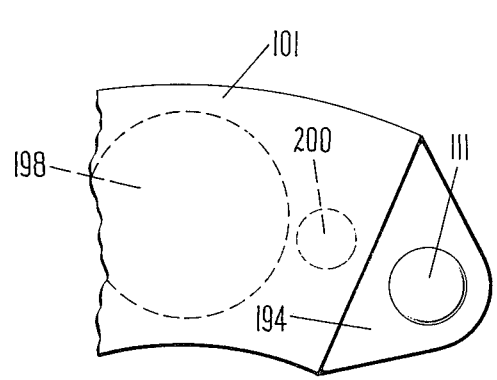
FIG. 11 is a fragmentary view taken substantially along the line 11—11 of FIG. 9.

Preferably, for symmetry two spring arrangements 200 are provided in the embodiment of FIGS. 9 and 10 with the spring arrangements symmetrically arranged on opposite sides of the hydraulic cylinder.

Figure 12:
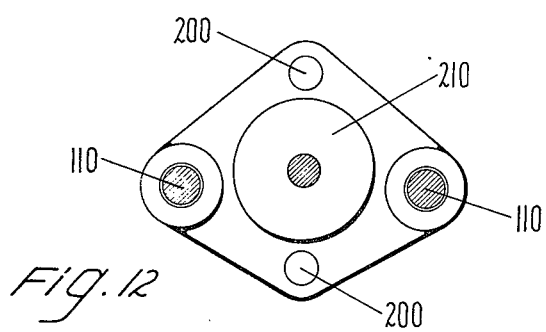
FIG. 12 is a schematic illustration in partial cross-section of a modified form of the invention.

The arrangement of the hydraulic cylinder, the guide pins and the return spring may be varied as is schematically illustrated in FIG. 12. In this embodiment the hydraulic cylinder 210 which may for example be similar to the cylinder 198 is centrally arranged with respect to the guide pins 110 and the return springs 200. The relative size of the components may also be varied depending upon the particular purpose for which the unit is designed.

Figure 14:
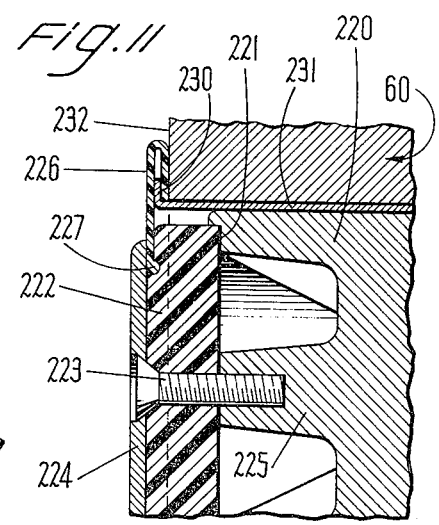
FIG. 14 is a fragmentary, cross-sectional detail showing a further modification of the embodiment illustrated in FIG. 9.
Figure 13:
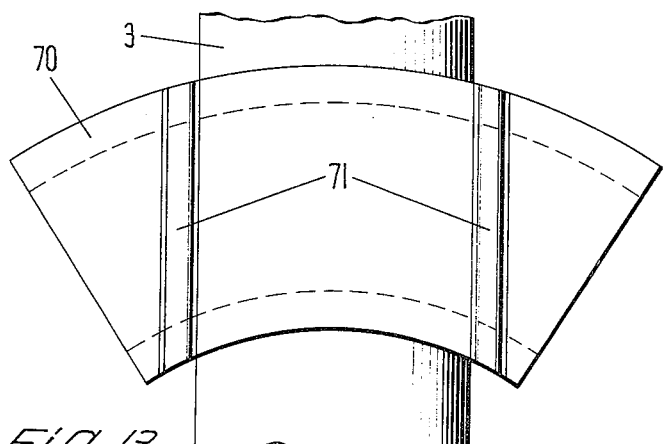
FIG. 13 is a fragmentary elevational view of the fork assembly useful in the embodiments described.

In FIG. 14 a further modification of the hydraulic piston arrangement is shown. In this configuration the piston 220 is provided with an annular shoulder 221 that receives a plastic disc 222 in turn secured by a screw 223 and a metal washer 224 to a center post 225 of the piston 220. An annular diaphragm 226 has an inner periphery 227 formed with a bead that is locked in an annular recess in the outer surface of the disc 222 by the inner surface of the metal washer 224. The outer periphery of the annular diaphragm 226 is locked between an outwardly extending flange 230 of the steel sleeve 231 and the inner surface 232 of the facing plate 60.

Referring now to FIGS. 15 through 18, there is illustrated an embodiment of the invention used on the rear wheel of a motorbike. The rear wheel 300 is supported on a swing fork 301 by a rear axle or shaft 302. The shaft 302 extends through a hub 303 which has a radially extending web 304 (FIG. 18). The hub is suitably supported on the shaft 302 by bearings 305 so that the web 304 may rotate relative to the fixed shaft 302. Extending radially from the hub 303 are a plurality of ribs 306 (FIG. 16). These ribs which may be six in number, extend from about halfway along the length of the web 304 to the hub 303, and thence to its outer, opposite ends. Each rib 306 is provided with a shoulder section 307, as illustrated in FIG. 18. A sprocket support 308 is positioned coaxial with the shaft 302. This support 308 is cylindrical in configuration and is provided with a central opening having a series of recesses conforming to and facing the portions of the ribs 306 adjacent one end of the hub 303. Intermediate the inner surface of the sprocket support 308 and the shoulder portions 307 of the ribs 306 is a continuous rubber or plastic liner 309. The sprocket support 308 is provided with an outer shoulder 311 which receives the core of a conventional motorcycle rear wheel sprocket 312. The sprocket 312 is secured to the support 308 by a series of screws 313. The other end of the sprocket support 308 conforms to and is spaced in close but sliding relation with respect to the housing 314. If desired, this end may be provided with an offset section 315 to minimize passage of water between the sprocket support 308 and the housing 314.

The wheel hub is provided with a steel disc 320 on one side and 321 on the other side that are similar to the steel discs 31 shown in FIG. 3. Brake pad assemblies 322, brake shoes 323, face or backing plate 324 and other braking assemblies similar to that shown in FIG. 3 are provided on the housing for effecting braking action between plates 320 and 321 and the brake pads 322. Lock means 325 support the base plates 324. These lock means 325 may comprise angular members having one leg 326 secured to a leg of the swing fork 301 and another leg 327 suitably locked or secured to the base plate. The leg 327 may be extended and may be provided with a keyway 328 interlocking with a meshing keyway on a face plate 324. This will permit movement of the shaft 302 for purposes of tightening the drive chain without disengagement of the face plate from the lock means 325.

Figure 19:
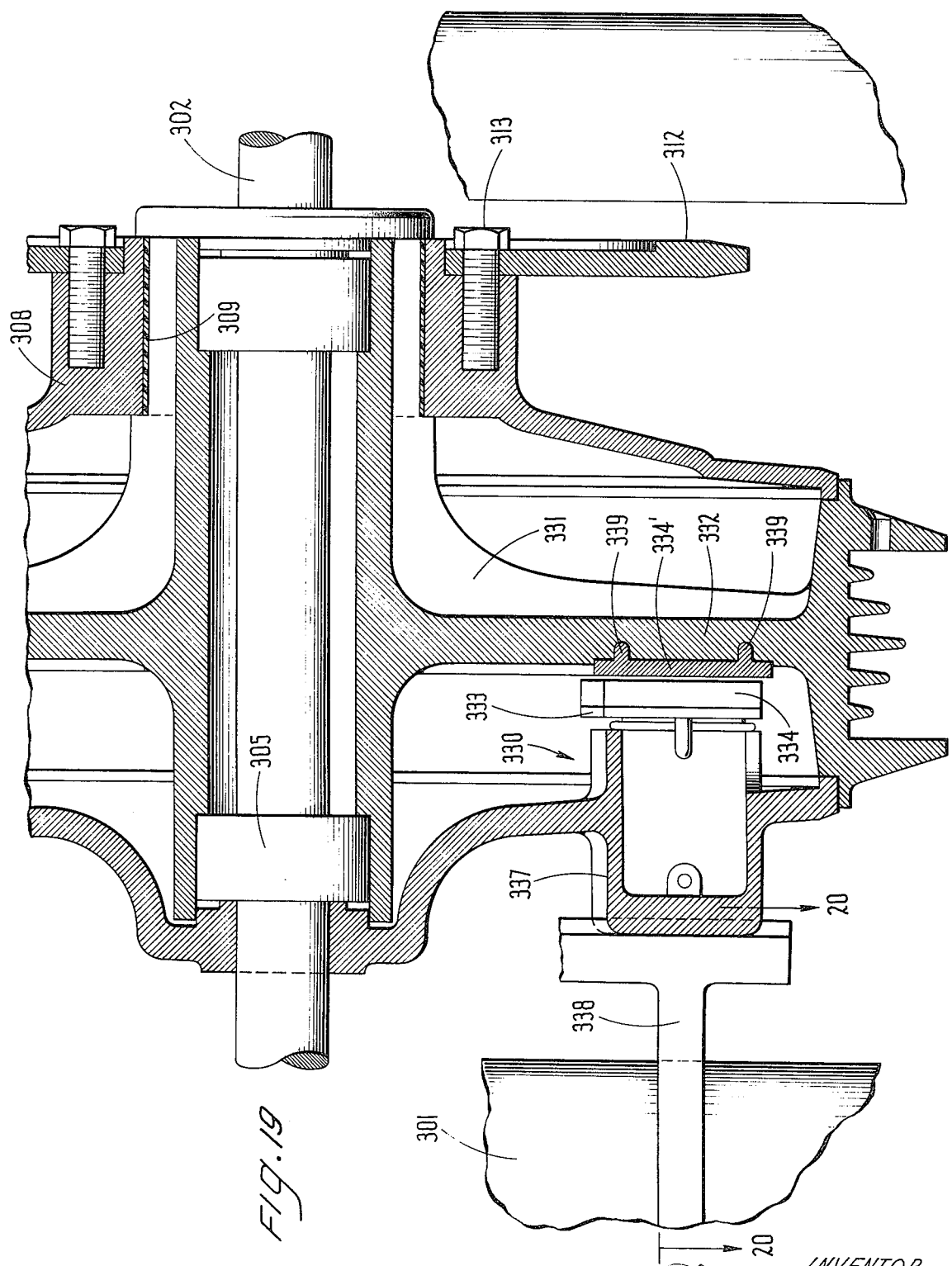
FIG. 19 is a modification of the embodiment of FIG. 18 taken along a line substantially the same as 18—18 in FIG. 15.

Referring to the modification of FIG. 19, there is shown a structure which is substantially the same as that shown in FIG. 18 except that a pair of hydraulic units on opposite sides of the web are not used. Rather, a single hydraulic unit generally illustrated at 330 is provided. The restraining means in this embodiment is effected by a rigid member rather than by utilizing a caliber type of action which is attained when two hydraulic systems are used in opposite relationship. In this embodiment the series of at least six ribs 331 provide a restraining means to minimize deflection of the web 332 when pressure of the brake shoe 333 and pad 334 is exerted by the hydraulic unit 330 against the steel disc 334'. The face plate 337 is secured against deflection in a manner as previously described by a locking means 338.

The steel disc 334' may, as illustrated, be provided in this and other embodiments including the embodiment used on the front wheels with a series of radially arranged dimples or bosses 339. These integrally cast bosses or dimples 339 fit into corresponding recesses in the web 332 to prevent rotation of the steel disc 334' relative to the web 332.

Referring to the FIG. 21, there is illustrated an arrangement in which a comparatively small hydraulic unit 350 having opposite hydraulic elements 351 and 352 are commonly supported on a support means 353, which in turn may be supported on one leg of the swing fork 301. This arrangement is useful where it is desirable to support the braking mechanism from one side only of the swing fork. Preferably, the braking mechanism is supported from the side opposite to the sprocket 358. Other elements not specifically described are similar to those described in connection with FIG. 18. In this embodiment, however, there is only provided one face plate 360 since the hub 361 is used to provide an enclosed interior. The hub 361 in this embodiment is provided with a disc-like wall 362 suitably ribbed at closely spaced intervals, as illustrated at 365. These ribs provide cooling for the hub 361. The inner side of the hub 361 is integrally formed with a cylindrical bearing 366, which in turn bears against the roller bearings 368. The sprocket 358 is suitably secured to this hub, as illustrated. The hub 361 is integrally formed with flange 370 that is concentric with shaft 371. Flange 370 is formed with annular cooling fins 372. A plurality of ribs 373 are formed on the inner surface of flange 370. The steel brake disc 375 is secured to the flange 370 by a series of screws 376 that pass through the disc 375 at its periphery into one each of the ribs 373. The steel disc 375 is annular in configuration and is provided with opposite surfaces 380 that are adapted to be engaged by the brake pads 381 of the hydraulic elements 351 and 352.

The hydraulic elements 351 and 352 function in the same fashion as those described in connection with FIG. 3 and may otherwise be similar in construction, are supported in the bracket 353. This bracket includes a web 390 that extends within the annular steel disc 375, and is supported at its base 391 by screws 392 to the leg 301 of the swing fork. The flange 390 has two opposed pairs of depending tabs. The tabs within each pair 393 and 394 are spaced apart so as to receive between the tabs in each pair respectively the hydraulic elements or systems 351 and 352. These elements may be suitably secured by screws 396.

Radially extending parallel flanges 397 integral with flange 370 provide conventional means for attachment of the spokes of the wheel, as illustrated in FIG. 15, and FIG. 17.

The steel disc 375 may, as illustrated in FIG. 17, be provided with slots or recesses 397 in its periphery to provide air circulation and cooling.

Referring to FIG. 17, the steel brake disc 375 is provided with a series of holes 397A. These openings have edges 397B the surfaces of which extend in non-perpendicular angles to the opposed faces of the steel brake disc 375. The surfaces 397B are angularly cut to cause air to move from the right side of the interior, illustrated in FIG. 21, towards the left side and through openings not shown in face plate 360. The air flow may be provided with a suitable manifold in the hub 361 and the face plate 360 thus rotation of the disc 375 causes a self-cooling effect of the braking system.

I claim:

1. A disc brake and wheel assembly for a vehicle having a fork with legs interconnected at the free end by an axle comprising:
   a wheel having a hub with an aperture for receiving the axle and positioning the hub intermediate the legs of the fork;
   a radially extending annular rotatable web having a cylindrical center coaxial with said axle;
   means supporting said web for rotation relative to said axle;
   a pair of face plates having their outer periphery terminating adjacent and movable relative to the web, and defining an enclosed space with a part of the web;

said web having a flanged outer end including tire support means;

a pair of annular bearing surfaces within said space;

said web having opposite faces for supporting respective bearing surfaces normal to, radially and at a fixed distance from the axis of said wheel;

a pair of brake shoe means with associated brake pad means, each said brake shoe means disposed adjacent a respective bearing surface;

each said brake shoe means including at least one hydraulic means for moving said brake pad means to and from braking engagement with said bearing surface;

and biasing means for normally urging said brake pad means away from said bearing surface;

said pair of face plates each including restraining means for supporting each said brake shoe means against rotation with said web;

said brake shoe means and restraining means aligned with said bearing surface, said said brake shoe means positioned between said bearing surface and said restraining means.

2. The assembly of claim 1 wherein a bottom segment of said face plate and the outer periphery of said wheel define a space for permitting passage of material therethrough.

3. The assembly of claim 1 wherein said web is T-shaped.

4. The assembly of claim 1 wherein said web has opposite faces defined by a section of the web that is thinner than said flanged outer end.

5. The assembly of claim 1 wherein said web is disposed generally centrally of said fork.

6. A disc brake and wheel assembly as set forth in claim 1 wherein said means for supporting said brake shoe means includes a hollowed out protruding section contacting the leg.

7. A disc brake as set forth in claim 1 including a cooling manifold integrally formed in at least one of said face plates, said cooling manifold comprising a section of said face plate having air passage means formed therein.

8. A disc brake as set forth in claim 7 wherein said cooling manifold is formed below said brake shoe means, and fluid passage means are provided intermediate said bearing surface and said face plate below said brake shoe means.

9. A disc brake means as set forth in claim 1 wherein said hydraulic means each comprise at least one cylinder and a hydraulically operated piston, means operatively interengaging said brake pad and said piston for moving said brake pad toward said bearing surface.

10. A disc brake means as set forth in claim 9 wherein said brake shoe means each comprise a brake shoe supporting said brake pad with said brake shoe supported at one end of a pair of pins and with the other end of said pins extending into a portion of said face plate.

11. A disc brake as set forth in claim 10 wherein means are provided for adjustably limiting the movement of said brake shoe comprising micrometer means for adjusting the limit of movement of said other end of said pins in said portion of said face plate.

12. A disc brake means as set forth in claim 9 wherein said means for moving said brake pad from said bearing surface comprises a spring secured to said brake shoe at one end and to said face plate at the other for returning said brake shoe and pad from engagement with said bearing surface.

13. A disc brake as set forth in claim 12 wherein said cylinders each have a diaphragm closing one end with said diaphragm having a flexible periphery secured to said brake shoe means and means interpositioned between said piston and said diaphragm for displacing said diaphragm axially with respect to said cylinder.

14. A disc brake means as set forth in claim 9 wherein said face plate is made of aluminum and said cylinders are lined with steel.

15. A disc brake as set forth in claim 1 including means for supporting a sprocket in rotational engagement with said bearing surface.

16. A disc brake and wheel assembly for a vehicle having a fork with legs interconnected at the free end by an axle, comprising:

a wheel having a hub with an aperture for receiving the axle and positioning the hub intermediate the legs of the fork;

a radially extending annular rotatable web having cylindrical center coaxial with said axle and tire support means;

means supporting said web for rotation relative to said axle;

a pair of face plates having their outer periphery movable relative to the web and defining an enclosed space with a part of the web;

at least one annular bearing surface within said space;

said web having a portion supporting said bearing surface normal to, radially and at a fixed distance from the axis of said wheel;

a brake shoe means within said space and having a brake pad means;

said brake shoe means adapted for moving said brake pad means to and from facing and braking engagement with said bearing surface;

at least one of said face plates having restraining means for supporting said brake shoe means against rotation with said web, said restraining means being positioned intermediate the legs of said fork so that the forces generated by said brake shoe means can be absorbed by said fork;

said brake shoe means and said restraining means aligned with said bearing surface, with said brake shoe means positioned between said bearing surface and said restraining means;

said brake shoe means comprising a cylinder, said cylinder having a hydraulically operated piston, a brake shoe extending normal to and across said cylinder axis, a pair of biasing means disposed adjacent said cylinder and coupled to said brake shoe, a pair of spaced guide pins engaged at one end to opposite ends of said brake shoe and extending parallel to said axis, means commonly supporting said cylinder, biasing means and guide pins with their axis parallel, said biasing means also being disposed intermediate said cylinder and respective guide pins.

17. A disc brake and wheel assembly for a vehicle having a fork with legs interconnected at the free end by an axle comprising:

a support member including a center core defining an aperture for receiving the axle and positioning the support member intermediate the legs of the fork, a web integrally formed with the core and extending radially of the axle defining a plane substantially symmetrically disposed intermediate the legs, and an annular crown integrally formed with the web and coaxially arranged with respect to said core;

said web having a dimension in the direction of the axle that is smaller than the web's radial dimension, and said crown having a dimension in the direction of the axle that is greater than the dimension of the web in the direction of the axle so as to provide in part a space for the brake means;

a pair of annular discs each having a bearing surface; means securing each disc on opposite axially outer sides of said web with said discs extending radially of said core;

and a pair of brake means one mounted adjacent each annular disc.

18. The disc brake and wheel assembly as set forth in claim 17 including a pair of face plate assemblies each including support webs for supporting one of the brake means.

19. The disc brake and wheel assembly as set forth in claim 18 wherein each face plate assembly includes a core portion and means for supporting said core portion for relative rotational movement with respect to the core of said support member.

* * * * *